(12) United States Patent
Lee

(10) Patent No.: US 7,914,299 B2
(45) Date of Patent: *Mar. 29, 2011

(54) USB APPLICATION DEVICE

(75) Inventor: Tsung-Shih Lee, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 84 days.

This patent is subject to a terminal disclaimer.

(21) Appl. No.: 12/541,880

(22) Filed: Aug. 14, 2009

(65) Prior Publication Data

US 2011/0039426 A1 Feb. 17, 2011

(51) Int. Cl.
*H01R 12/00* (2006.01)
(52) U.S. Cl. ...................................... 439/76.1
(58) Field of Classification Search ............... 439/76.1, 439/79, 80, 934
See application file for complete search history.

(56) References Cited

U.S. PATENT DOCUMENTS

| | | | |
|---|---|---|---|
| 7,035,110 B1* | 4/2006 | Wang et al. | 361/737 |
| 7,095,617 B1* | 8/2006 | Ni | 361/736 |
| 7,307,849 B2* | 12/2007 | Ho et al. | 361/737 |
| 7,359,208 B2* | 4/2008 | Ni | 361/752 |
| 7,748,995 B1* | 7/2010 | Lee | 439/76.1 |
| 7,824,227 B1* | 11/2010 | Lee et al. | 439/660 |
| 7,833,056 B1* | 11/2010 | Lee et al. | 439/607.23 |
| 2008/0212297 A1* | 9/2008 | Ni et al. | 361/760 |
| 2009/0190277 A1* | 7/2009 | Hiew et al. | 361/56 |

\* cited by examiner

*Primary Examiner* — Neil Abrams
*Assistant Examiner* — Phuong T Nguyen

(57) ABSTRACT

An USB application device includes a casing and a printed circuit board received in the casing. The printed circuit board includes a top surface disposed a plurality of contacts, and a bottom surface disposed a plurality of electrical elements. A first supporting portion is received in the casing and located between the bottom surface of the printed circuit board and the casing, which supports the printed circuit board and is in front of all the electrical elements and abuts against up front one of the electrical elements disposed on the bottom surface of the printed circuit board. Therefore, the first supporting portion supports a central portion of the printed circuit board to resist an external pressing force in order to prevent the printed circuit board from damage. Furthermore, the first supporting portion positions the printed circuit board during the fabricating procedure of the USB application device.

13 Claims, 5 Drawing Sheets

USB APPLICATION DEVICE

BACKGROUND OF THE INVENTION

1. Field of the Invention

The present invention relates to an USB application device, more specifically, to a compact USB application device.

2. The Related Art

Because Universal serial bus (USB) interface has advantages of high convenience, high compatibility and high transmission speed, it is widely applied to various electronic devices such as personal computers, MP3 players, MP4 players, external storage devices, laptops, flash storage devices, etc. Hence, USB interface becomes one of the standard interfaces of the electronic devices.

A conventional USB compatible application apparatus is disclosed in U.S. Pat. No. 7,165,998. The USB compatible application apparatus has a printed circuit board (PCB) to be a carrying board inside of a connector. A top surface of the PCB carrying board includes a plurality of terminals. A board bottom sandwich is formed between a bottom surface of the PCB carrying board inside the connector and a covering shell of the connector. At least one electrical element is fixed on the bottom surface of the PCB carrying board inside the connector.

Therefore, the present invention can shorten the length of the USB compatible application devices or improve working efficiency of the USB compatible application device. The thickness of the connector is further reduced because the thickness of the PCB carrying board is approximately 0.3 millimeter (mm) to 1 mm.

Furthermore, the board bottom sandwich has at least one supporting structure, front end protection layer, and a combination thereof capable of connecting to the PCB carrying board. Hence, the supporting structure can fix the size of the board bottom sandwich and prevent the board bottom sandwich from transforming by the unexpected outer force. The front end protection layer can protect the electrical element located inside the board bottom sandwich and meanwhile efficiently strengthen the structure of the board bottom sandwich.

However, the front end protection layer and the supporting structure merely support a front side and lateral sides of the PCB carrying board inside the connector. There is not any supporting structure in central area of the board bottom sandwich for supporting a central portion of the PCB carrying board inside the connector.

If a corresponding USB connecting bracket plugs into a connecting sandwich formed between the top surface and the covering shell inside the connector, then the terminals of the corresponding USB connecting bracket will press the PCB carrying board into the connector. Hence, the central portion of the PCB carrying board inside the connector may be damaged because the PCB carrying board is thin and approximately 0.3 mm to 1 mm and there is not any supporting structure supports the central portion of the PCB carrying board inside the connector to resist the pressing force from the USB connecting bracket.

SUMMARY OF THE INVENTION

An object of the present invention is to provide an USB application device has a compact size and an improved structure to resist an external force.

According to the invention, the USB application device has a casing and a PCB completely received in the casing. The PCB has a top surface and a bottom surface opposite to the top surface. The bottom surface of the PCB is disposed a plurality of electrical elements. The top surface of the PCB is disposed a plurality of contacts. A first supporting portion is received in the casing and located between the bottom surface of the PCB and the casing.

The first supporting portion supports the PCB, which is in front of all the electrical elements and abuts against up front one of the electrical elements disposed on the bottom surface of the PCB. Therefore, the first supporting portion supports a central portion of the PCB to resist an external pressing force in order to prevent the PCB from damage. Furthermore, the first supporting portion positions the PCB in the fabricating procedure of the USB application device.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENT

Figure 1:
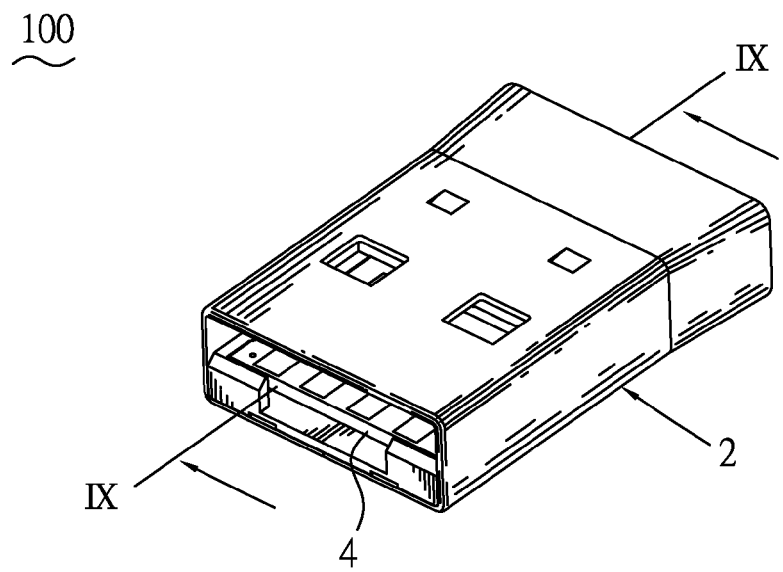
FIG. 1 shows a perspective view of a preferred embodiment of an USB application device according to the present invention.
Figure 2:
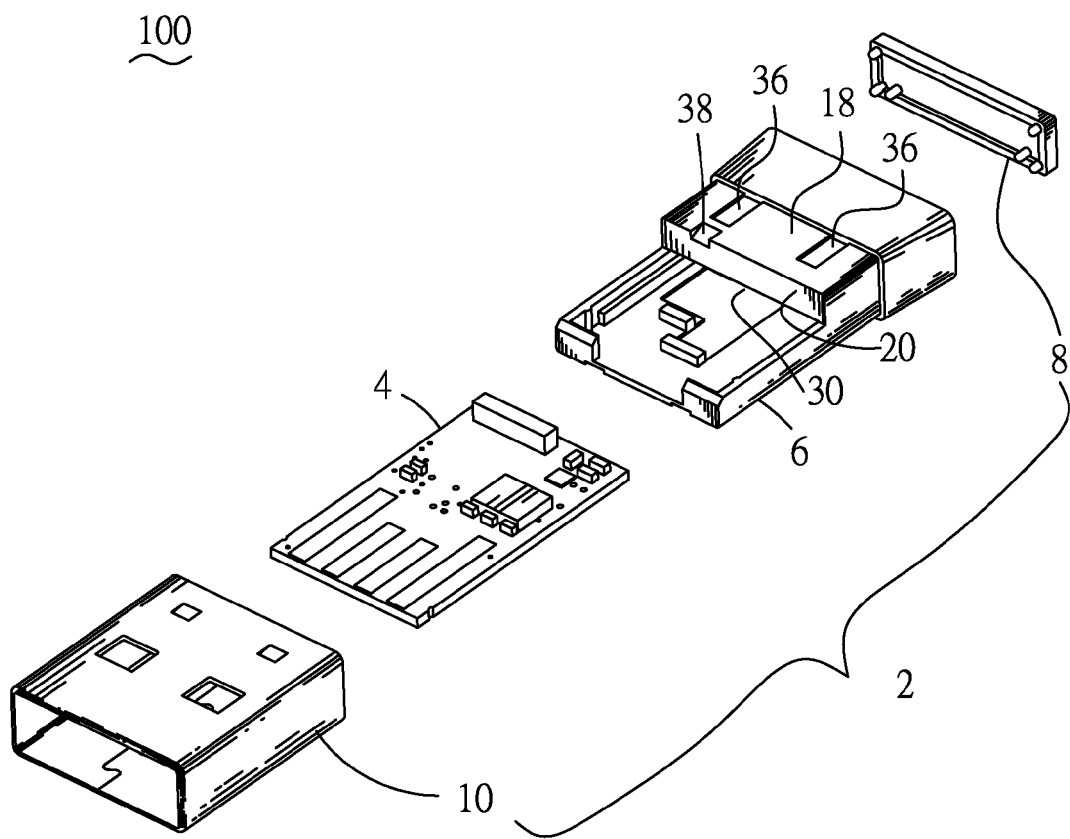
FIG. 2 shows an exploded view of the USB application device in FIG. 1.

Please refer to FIG. 1 and FIG. 2. A preferred embodiment of an USB application device 100 is a wireless USB dongle. The wireless USB dongle is selectively one of standard specifications of Bluetooth, radio-frequency identification (RFID), WiFi, worldwide interoperability for microwave access (WiMAX), ZigBee, global system for mobile communications (GSM), General packet radio service (GPRS), 3rd generation partnership project (3GPP), global positioning system (GPS), etc.

The USB application device 100 has a casing 2 and a PCB 4 received in the casing 2. The casing 2 has a housing 6, a rear cover 8 and a shell 10. The housing 6 and the rear cover 8 are made of an isolated material. The shell 10 is made of a metal material.

Figure 3:
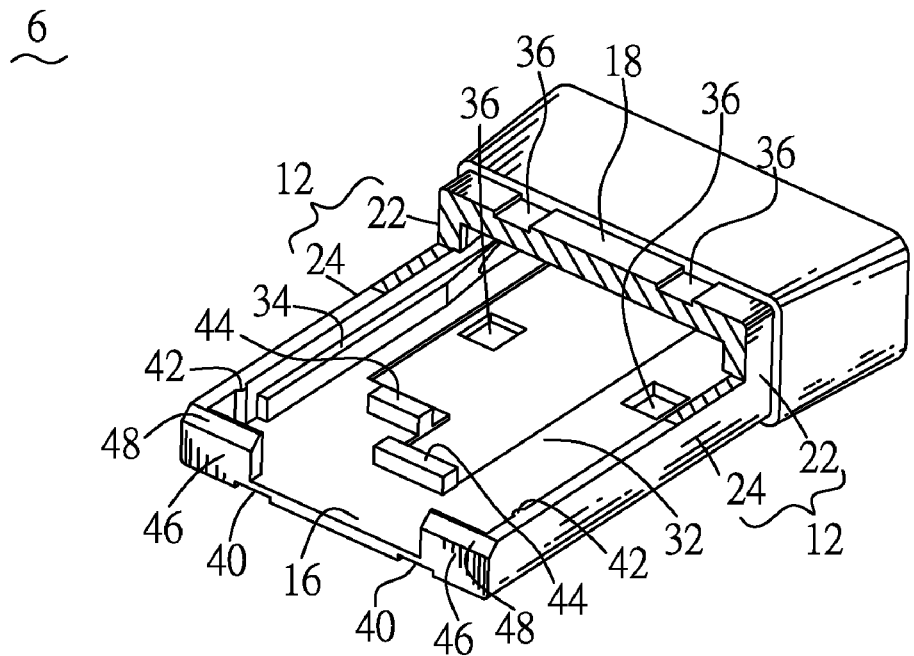
FIG. 3 shows a perspective view of a housing of the USB application device being cut a fixing wall and a front portion of a top wall in FIG. 1.
Figure 4:
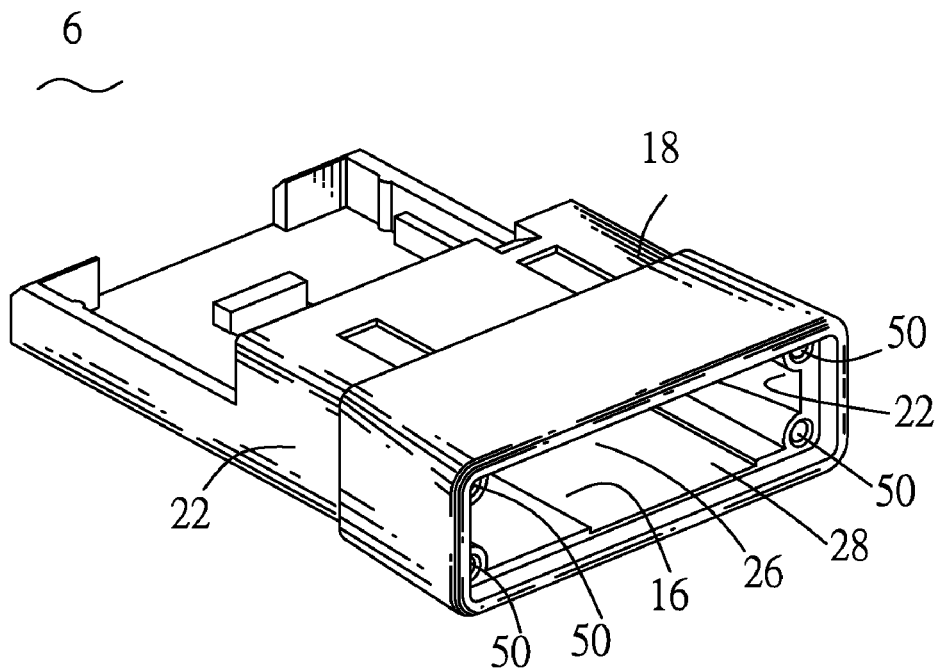
FIG. 4 is a rear view of the housing of the USB application device in FIG. 1.
Figure 9:
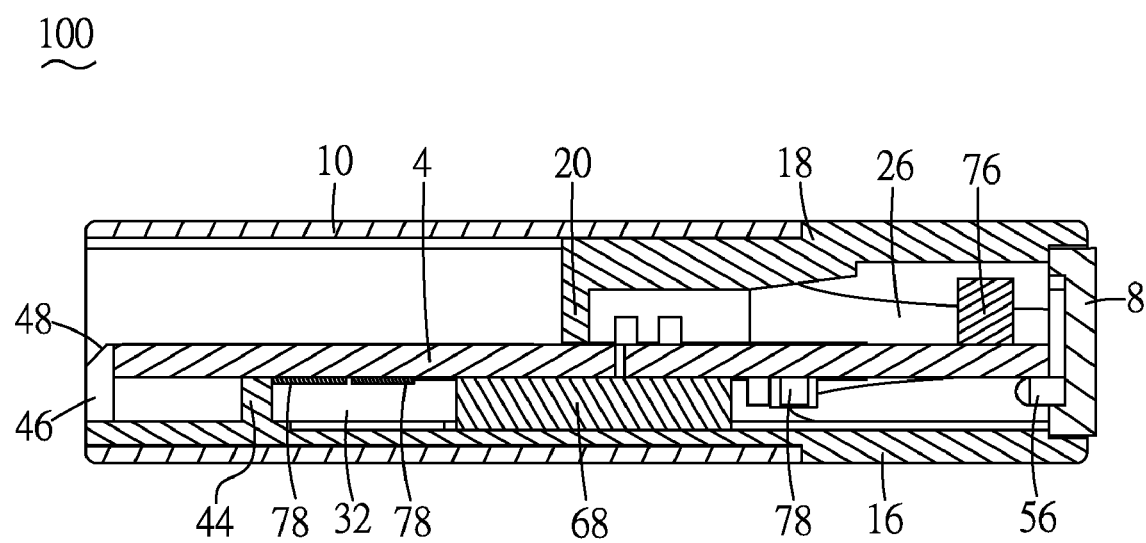
FIG. 9 is a cross-sectional view of the USB application device taken along line IX-IX in FIG. 1.

Please refer to FIG. 3, FIG. 4 and FIG. 9. The housing 2 has two side walls 12, a bottom wall 16, a top wall 18 and a fixing wall 20. The side walls 12 respectively have a first portion 22 and a second portion 24. The first portion 22 is higher than the second portion 24.

The first portions 22 of the side walls 12 respectively connect to lateral sides of the bottom wall 16 and the top wall 18 to surround a rear receiving space 26. The rear sides of the side walls 12, the bottom wall 16 and the top wall 18 define a rear opening 28 connected to the rear receiving space 26.

The fixing wall 20 extends from an inner surface of the top wall 18. Especially, the fixing wall 20 perpendicularly extends from a front side of the top wall 18 and towards the bottom wall 16. Lateral sides of the fixing wall 20 connect to the two side walls 12. The two side walls 12, the bottom wall 16 and a bottom side of the fixing wall 20 surround a front opening 30 connected to the rear receiving space 26.

The second portions 24 of the side walls 12, and the bottom wall 16 define a front receiving space 32. Each of inner surfaces of the side walls 12 is projected a rib 34 (only shown the rib projected from the inner surface of the side wall). Especially, the rib 34 extends from the inner surface of the first portion 22 and to the inner surface of the second portion 24.

Each of the outer surfaces of the bottom wall 16 and the top wall 18 is formed a pair of hollows 36. A first guiding portion 38 is formed at an outer surface of a corner between the top wall 18 and the fixing wall 20 and aligned with one of the hollows 36 formed on the top wall 18. Especially, the first guiding portion 38 is of a slanted surface.

An outer surface of the bottom wall 16 defines a second guiding portion 40. Especially, the second guiding portion 40 is a pair of grooves aligned with the hollows 36 formed on the bottom wall 16 respectively. One end of each of the grooves opens at a front side of the bottom wall 16, and the other end straightly extends towards the corresponding hollow 36.

Each of inner surfaces of the second portions 24 of the two side walls 12 projects a projection 42. A first supporting portion 44 is arranged at a central portion of the front receiving space 32. Especially, the first supporting portion 44 projects from an inner surface of the bottom wall 16. The first supporting portion 44 is of a rib shape. A top surface of the rib 34 and a top surface of the first supporting portion 44 are at the same level.

Each of the opposite ends of the front side of the bottom wall 16 upwardly extends a block 46. Especially, the blocks 46 respectively connect to the front sides of side walls 12. A third guiding portion 48 is formed at each of top surfaces of the blocks 46. The third guiding portion 48 is of a slanted surface.

Each of the corners located between rear side portions of the side wall 12 and the bottom wall 16, the first side wall 12 and the top wall 18 is formed a hole 50.

Figure 5:
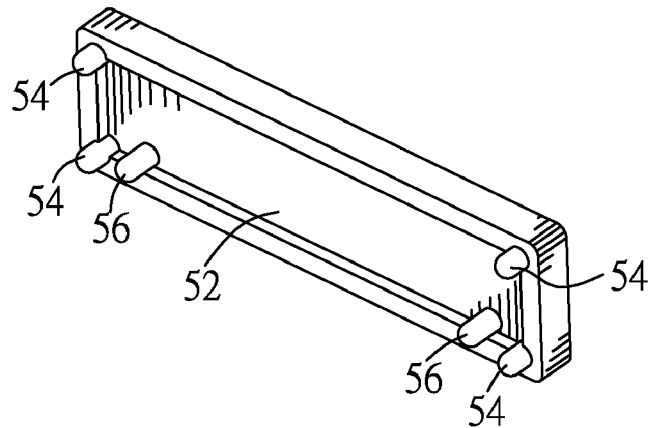
FIG. 5 is a perspective view of a rear cover of the USB application device in FIG. 1.

Please refer to FIG. 5. The rear cover 8 has a body portion 52, a plurality of pillars 54 and a second supporting portion 56. The body portion 52 is of a plate shape. The profile of the body portion 52 matches up the profile of the rear opening 28 of the housing 6. In this case, the housing 6 and the rear opening 28 are substantially of a rectangular shape, and therefore, the body portion 52 of the rear cover 8 is also of a rectangular shape.

The pillars 54 are aligned with the holes 50 of the housing 6 respectively. The pillars 54 are projected from four corners of one surface of the body portion 52 respectively and perpendicular to the body portion 52. The second supporting portion 56 is projected from the surface of the body portion 52. Especially, the second supporting portion 56 is of a pillar shape.

Figure 6:
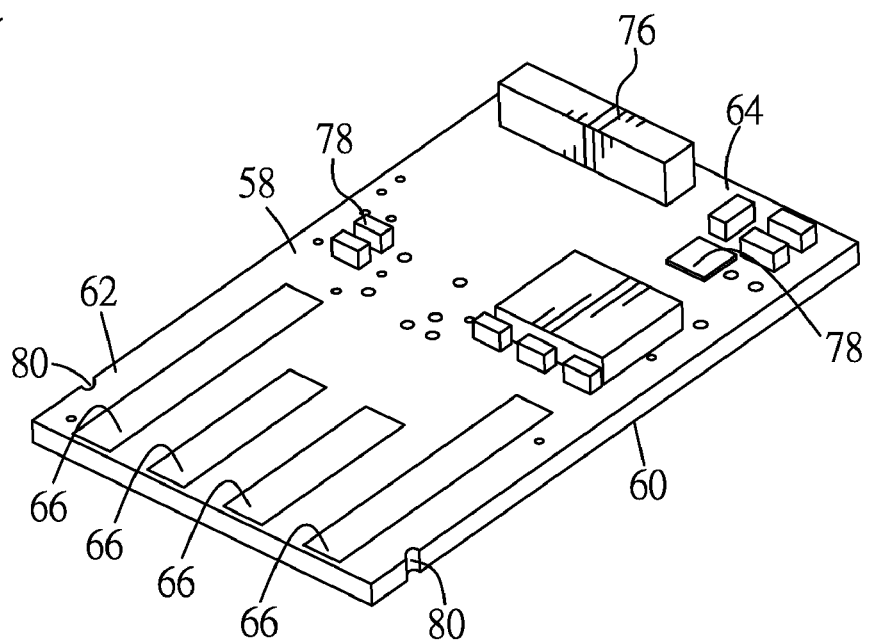
FIG. 6 shows a PCB of the USB application device in FIG. 1.

Please refer to FIG. 6. The PCB 4 has a top surface 58, a bottom surface 60 opposite to the top surface 58, a front end potion 62 and a rear end portion 64 opposite to the front end portion 62. The top surface 58 of the front end portion 62 is disposed four contacts 66. The contacts 66 functions as power contact (VCC), ground contact (GND) and differential signal transmission contacts (D+, D−) respectively in order to comply with USB standard specification. An integrated circuit (IC) 68 is fixed on the bottom surface 60 of the PCB 4 and between the front end portion 62 and the rear end portion 64.

Figure 7:
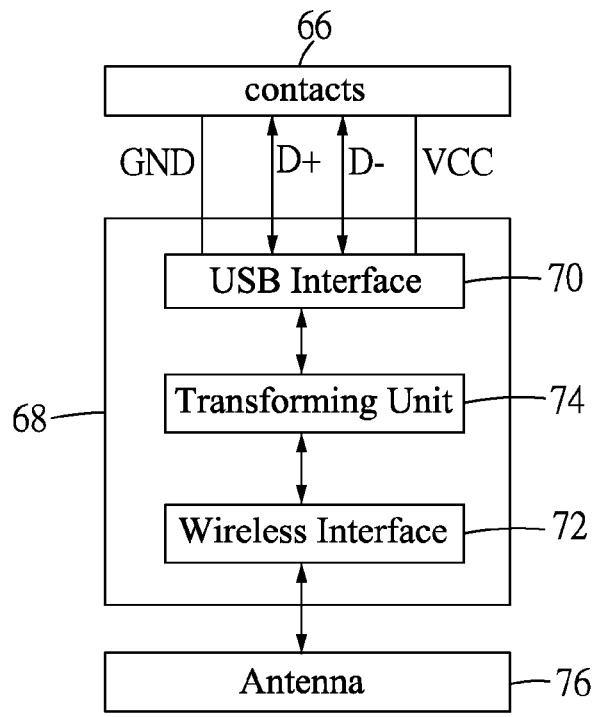
FIG. 7 shows a block diagram of an integrated circuit of the USB application device in FIG. 1.

Please refer to FIG. 7. The IC 68 has an USB interface 70, a wireless interface 72 and a transforming unit 74 interconnecting the USB interface 70 and the wireless interface 72. In this case, the wireless interface 72 is a Bluetooth interface. The transforming unit 74 can receive USB signal form the USB interface 70 and transforming USB signal to Bluetooth signal, and than send Bluetooth signal to the wireless interface 72.

The transforming unit 74 also can receive Bluetooth signal form the wireless interface 72 and transforming Bluetooth signal to USB signal, and than send USB signal to the USB interface 70. Hence, the transforming unit 74 functions as a bridge connecting between the USB interface 70 and the wireless interface 72. Additionally, the wireless interface 72 can be one of RFID, WiFi, WiMAX, ZigBee, GSM, GPRS, 3GPP, GPS, etc.

The USB interface 70 of the IC 68 connects the contacts 66 via a set of conducting traces (not shown in figures) printed on the PCB 4. The top surface 58 of the rear end portion 64 is disposed an antenna 76 connected to the wireless interface 72 of the IC 68 via a conducting trace (not shown in figures). The antenna 76 can transmit and receive wireless signal.

The bottom surface 60 of the front end portion 62 are disposed a plurality of electrical elements 78. A portion of rear end portion 64 of the PCB 4 near the antenna 76 is not disposed any electrical element 78 in order to prevent the antenna 76 from interference. Each of lateral sides of the front end portion 62 of the PCB 4 is formed an indentation 80.

Figure 8:
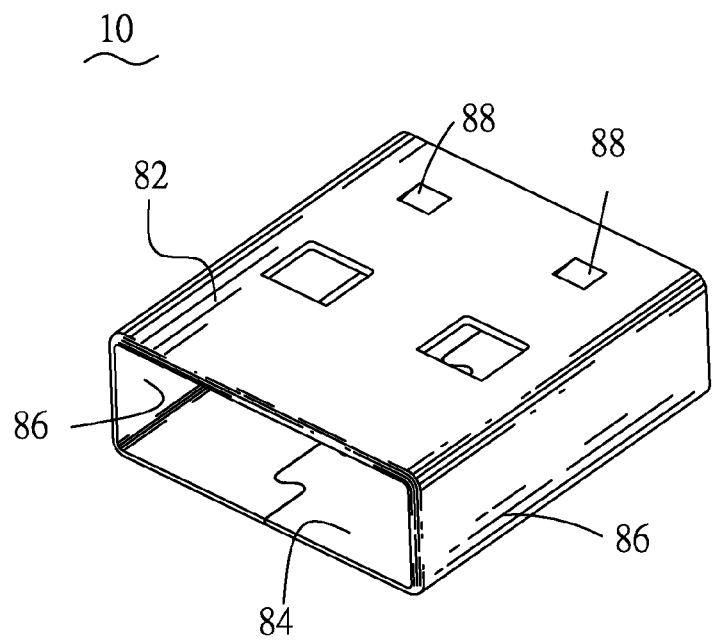
FIG. 8 is a perspective view of a shell of the USB application device in FIG. 1.

Please refer to FIG. 8. The shell 10 has a top plate 82, a bottom plate 84 opposite to the top plate 82 and opposite side plates 86. The side plates 86 connect lateral sides of the top plate 82 and the bottom plate 84 respectively. The top plate 82 and the bottom plate 84 are formed a pair of wedges 88 respectively (only shown the wedges at the top plate).

The fabricating procedure of the USB application device 100 are described as following. First, the PCB 4 is inserted into the housing 6 from the rear opening 28. The rear end portion 64 of the PCB 4 is completely received in the rear receiving space 26 of the housing 6. The front end portion 62 of the PCB 4 is received in the front receiving space 32 of the housing 6.

The ribs 34 of the housing 6 support lateral sides of the PCB 4. The first supporting portion 44 supports a central portion of the front end portion 62 of the PCB 4. The contacts 66 are exposed outside of the front receiving space 32. The location of the first supporting portion 44 corresponds to the location of the electrical element 78 disposed on the bottom surface 60 of the front end portion 62 of the PCB 4.

The first supporting portion 44 is in front of the electrical elements 78 disposed on the bottom surface 60 of the front end portion 62 of the PCB 4. Hence, the PCB 4 may smoothly insert into the housing 6. If the PCB 4 is completely received in the housing 6, then the first supporting portion 44 will abut against the electrical element 78 for positing the PCB 4 and preventing the PCB 4 from moving forwards. Furthermore, the first supporting portion 44 can protect the electrical elements 78.

The projection 42 of housing 6 is engaged into the indentations 80 of the PCB 4 to position the PCB 4 and prevent the PCB 4 form moving. The IC 68 further has a printed surface. Generally speaking, the printed surface is printed or carved serial number, manufacturer's name, manufacturer's mark of the IC 68. The printed surface of the IC 68 abuts against the inner surface of the bottom wall 16.

Hence, the IC 68 supports a middle portion of the PCB 4 between the front end portion 62 and the rear end portion 64. The bottom side of the fixing wall 20 abuts against the middle portion of the top surface 58 of the PCB 4. The middle portion of the PCB 4 and the IC 68 are together sandwiched in the front opening 30 of the housing 6.

Second, the rear cover 8 covers the rear opening 28 of the housing 6. The pillars 54 of the rear cover 8 are engaged into the holes 50 of the housing 6. The second supporting portion 56 of the rear cover 8 supports the rear end portion 64 of the PCB 4.

Finally, the front end portion 62 of the PCB 4, the second portions 24 of the side walls 12 and a portion of the bottom wall 16 are received in the shell 10. The wedges 88 formed on the top plate 82 and the bottom plate 84 are guided by the first guiding portion 38 and the second guiding portion 40 of the housing 6 to engage into the hollows 36 formed on the top wall 18 and the bottom wall 16 of the housing 6 respectively.

The contacts 66, the front end portion 62 of the PCB 4 and the shell 10 form as a standard A-type USB connector. The shell 10 can enhance ESD protection and therefore the USB application device 100 can comply with USB standard specification.

If the USB application device 100 couples to the electrical apparatuses, then a carrier of a mating connector of the electronic apparatuses (not shown in figures) will be guided to plug into a space between the top surface 58 of the PCB 4 and the shell 10 by the third guiding portion 48. Hence, mating contacts of the mating connector can couple to the contacts 66 of the PCB 4 of the USB application device 100. Furthermore, the blocks 46 of the housing 6 prevent the carrier of the mating connector from inserting into a space between the bottom surface 58 of the PCB 4 and the bottom surface 16 of the housing 6.

The mating contacts of the mating connector press the front end portion 62 of the PCB 4. The ribs 34 and the first supporting portion 44 of the housing 6 respectively support the lateral sides and the central portion of the front end portion 62 of the PCB 4 in order to resist the pressing force of the mating connector and prevent the PCB 4 from damage.

In further embodiment, the blocks 46 may be removed and the first supporting portion 44 may protect the electrical elements 78 disposed on the bottom surface 60 of the front end portion 62 of the PCB 4 if the USB application device 100 couples to the electrical apparatuses and the mating connector of the electrical apparatuses inserts into the space between the bottom surface 60 of the PCB 4 and the bottom surface 16 of the housing 6.

As described above, the first supporting portion 44 supports the central portion of the front end portion 62 of the PCB 4 to resist an external pressing force and prevent the PCB 4 from damage. The first supporting portion 44 may position the PCB 4 in the fabricating procedure.

Additionally, the blocks 46 of the housing 6 prevent the carrier of the mating connector from inserting into the space between the bottom surface 60 of the PCB 4 and the bottom wall 16 of the housing 6, and guide the carrier of the mating connector to insert into the space between the top surface 58 of the PCB 4 and the shell 10.

Furthermore, the present invention is not limited to the embodiments described above; diverse additions, alterations and the like may be made within the scope of the present invention by a person skilled in the art. For example, respective embodiments may be appropriately combined.

What is claimed is:

1. An USB application device, comprising:
    a casing;
    a printed circuit board completely received in the casing and comprising a top surface and a bottom surface opposite to the top surface;
    a plurality of electrical elements disposed on the bottom surface of the printed circuit board;
    a plurality of contacts disposed on the top surface of the printed circuit board;
    a first supporting portion received in the casing and located between the bottom surface of the printed circuit board and the casing;
    wherein the first supporting portion supports the printed circuit board, which is in front of all the electrical elements and abuts against up front one of the electrical elements disposed on the bottom surface of the printed circuit board;
    wherein the casing has a housing and a shell coupled with the housing, the printed circuit board has a front end portion and a rear end portion opposite to the front end portion, the contacts are disposed on the top surface of the first end portion of the printed circuit board, the rear end portion of the printed circuit board is received in housing, the contacts is exposed outside the housing and received in the shell, the first supporting portion supports a central portion of the front end portion of the printed circuit board;
    wherein the housing has a bottom wall, a top wall opposite to the top wall and opposite side walls, each of side walls has a first portion and a second portion, the first portions of the side walls respectively connect to opposite sides of the bottom wall and the top wall to surround a rear receiving space for receiving the rear end portion of the printed circuit board, the second portions of the side walls only connect to the bottom wall to form a front receiving space for receiving the front end portion of the printed circuit board and the first supporting portion, the contacts are exposed outside the front receiving space and received in the shell covering the second portions of the side walls;
    wherein the first portions are higher than the second portions.

2. The USB application device as claimed in claim 1, further comprising a fixing wall extending from the top wall and towards the bottom wall, a front opening formed among a bottom edge of the fixing wall, the bottom wall, and the side walls to interconnect the rear receiving space and the front receiving space.

3. The USB application device as claimed in claim 2, wherein the bottom surface of a middle portion of the printed circuit board is fixed an integrated circuit, the bottom edge of the fixing wall connects to the top surface of the middle potion of the printed circuit board, the integrated circuit connects to the bottom wall, the middle portion of the printed circuit board and the integrated circuit are together sandwiched in the front opening.

4. The USB application device as claimed in claim 3, wherein at least one of opposite sides of a front edge of the bottom wall of the housing upwardly extends a block.

5. The USB application device as claimed in claim 4, wherein a top surface of the block defines a guiding portion.

6. The USB application device as claimed in claim 4, wherein inner surfaces of the side walls of the housing respectively project a rib, the rib extends from the first portions and to the second portions of the side walls for supporting opposite sides of the printed circuit board.

7. The USB application device as claimed in claim 6, further comprising at least one indentation formed on one of the side edges of the printed circuit board, and at least one projection projected from one of inner surfaces of the side walls for engaging into the indentation.

8. The USB application device as claimed in claim 6, wherein the top surface of the rear end portion of the printed circuit is disposed an antenna.

9. The USB application device as claimed in claim 6, further comprising at least one hollow formed on outer surfaces of the bottom wall and the top wall and at least one wedge formed on a bottom plate of the shell and a top plate of the shell opposite to the bottom plate for engaging into the corresponding hollow.

10. The USB application device as claimed in claim 9, further comprising at least one first guiding portion formed on the top wall of the housing and at least one second guiding portion formed on the front bottom wall for guiding the wedge to engage into the hollow.

11. The USB application device as claimed in claim 6, further comprising a rear opening being surrounded by the rear edges of the bottom wall, top wall and side walls, and a rear cover covering the rear opening.

12. The USB application device as claimed in claim 11, further comprising at least one second supporting portion projected from the rear cover and supporting the rear end portion of the printed circuit board.

13. An USB application device, comprising:

an isolated housing having a bottom wall, a top wall opposite to the top wall, opposite side walls respectively connected to opposite sides of the bottom wall and the top wall;

a printed circuit board received in the isolated housing and having a top surface and a bottom surface opposite to the top surface, a front end portion and a rear end portion opposite to the front end portion;

a plurality of electrical elements disposed on the bottom surface of the printed circuit board;

a plurality of contacts disposed on the top surface of the front end portion of the printed circuit board and exposed outside of the isolated housing;

a first supporting portion projected from an inner surface of the bottom wall for supporting a central portion of the front end portion of the printed circuit board, which is in front of all the electrical elements and abuts against up front one of the electrical elements disposed on the bottom surface of the printed circuit board;

a second supporting portion projected from inner surfaces of the side walls for supporting opposite sides of the printed circuit board;

a metal shell covering the front end portion of the printed circuit board and the contacts; and at least one block upwardly extended from one of opposite ends of a front edge of the bottom wall of the isolated housing;

wherein the first portions are higher than the second portions.

\* \* \* \* \*